United States Patent [19]

Ratts

[11] 3,853,531

[45] Dec. 10, 1974

[54] PLANT REGULATION WITH 2-HALO-2',6'-DIALKYL-N-ACYL-OXYMETHYL-ACETANILIDES

[75] Inventor: Kenneth Wayne Ratts, Creve Coeur, Mo.

[73] Assignee: Monsanto Company, St. Louis, Mo.

[22] Filed: June 21, 1972

[21] Appl. No.: 265,072

[52] U.S. Cl.................................... 71/76, 71/106
[51] Int. Cl............................................. A01n 5/00
[58] Field of Search...................... 71/118, 106, 76

[56] References Cited
UNITED STATES PATENTS

| | | | |
|---|---|---|---|
| 2,962,523 | 11/1960 | Godt, Jr. | 71/106 |
| 3,236,871 | 2/1966 | Hinman et al. | 71/118 |
| 3,371,106 | 2/1968 | Berliner et al. | 71/118 |
| 3,475,155 | 10/1969 | Ishida et al. | 71/118 |
| 3,547,620 | 12/1970 | Olin | 71/118 |
| 3,691,234 | 9/1972 | Kiefer et al. | 71/118 |

FOREIGN PATENTS OR APPLICATIONS 1,078,071  8/1967  Great Britain ....................... 71/118

OTHER PUBLICATIONS

Tulyagnov et al., I "Reaction of Some N-(2-hydroxyalkyl)arylamines etc.," (1970), CA 73, No. 66523m. (1970).

Tulyaganov et al., II "Reactions of α-halohydrins with amines," (1966), CA 65, p. 3772, (1966).

*Primary Examiner*—Glennon H. Hollrah
*Attorney, Agent, or Firm*—Arnold H. Cole; Donald W. Peterson; Neal E. Willis

[57] ABSTRACT

The natural growth or development of plants is regulated by an application of a 2-halo-2',6'-dialkyl-N-acyloxymethyl-acetanilide to said plants.

8 Claims, No Drawings

PLANT REGULATION WITH 2-HALO-2',6'-DIALKYL-N-ACYL-OXYMETHYL-ACETANILIDES

This invention relates to a method for regulating the natural growth or development of plants by means of chemical treatment. More particularly, this invention is concerned with a method wherein growing plants are treated with a chemical substance which alters their natural growth or development to enhance various agricultural or horticultural features of the plants. As employed herein, the term "natural growth or development" designates the normal life cycle of the plant in accordance with its genetics and its environment, in the absence of artificial, external influences.

It is to be understood, at the outset, that the regulation of natural growth and development hereinafter discussed does not include killing or herbicidal action. Although phytotoxic or lethal amounts of the materials disclosed herein might be employed to destroy certain plants, it is contemplated here to employ only such amounts of said materials as will serve to regulate the natural growth and development of useful plants without substantial injury. As may be expected, and as long understood by those skilled in the art, such effective plant regulating amounts will vary, not only with the particular material selected for treatment, but also with the regulatory effect to be achieved, the species of plant being treated and its stage of development, and whether a permanent or transient regulating effect is sought. Other factors which may bear upon the determination of an appropriate plant regulating amount include the plant growth medium, the manner in which the treatment is to be applied, weather conditions such as temperature or rainfall, and the like.

In accordance with the instant invention it has been found that desirable regulation of natural plant growth or development is achieved by application of a 2-halo-2',6'-dialkyl-N-acyloxymethyl-acetanilide, as hereinafter defined, to plants in various stages of development. Accordingly, in the practice of this invention the acetanilide can be applied to the plant in the seedling stage, flowering stage, fruiting stage or maturing stage and the like or can be applied to plants at more than one stage of development. Such application may be made directly to one or more of the plants's parts, such as, roots, stems, leaves, flowers, fruit or the like or application can be made indirectly as by treatment of the growth medium of the plant.

The acetanilides employed in practicing the method of this invention are illustrated by the formula

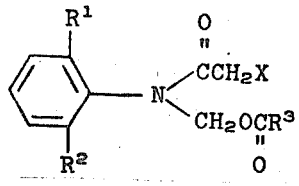

wherein $R^1$ and $R^2$ are independently methyl or ethyl, $R^3$ is methyl, ethyl or cyclopropyl and X is bromo or, preferably, chloro. A particularly preferred class of acetanilides of the above formula are the 2-chloro acetanilides wherein $R^1$ and $R^2$ are the same.

The active acetanilides of the above formula can be prepared by a carbonium ion type reaction of a 2halo-N-(substituted methyl) acetanilide with a monocarboxylic acid. The methyl substituent can be any group that is capable of forming a carbonium ion and is readily displaced under acidic conditions such as halo, alkoxy, hydroxy and similar leaving groups.

For example, approximately 140 parts by weight of 2-chloro-2', 6'-diethyl-N-(chloromethyl) acetanilide dissolved in tetrahydrofuran are heated and maintained at reflux with a tetrahydrofuran solution of about 40 parts by weight of propionic acid in a suitable reaction vessel with an incremental addition of about 55 parts by weight of triethylamine for a period of about 3 hours. The reaction medium is cooled to room temperature and the resulting precipitate is filtered, washed, stripped and recrystallized from hexane to yield a 2-chloro-2',6'-diethyl-N-(propionyloxymethyl) acetanilide having a melting point of 64°–65°C.

Further details of the preparation of the acetanilides useful in the practice of this invention are found in the pending application of J. F Olin, Ser. No. 148,894, filed June 1, 1971 which are not to be construed as a part of the instant invention.

Regulation of the natural growth or development of plants by chemical treatment may result from the effect of the chemical substance on the physiological processes of the plant, or it may be due to the effect of such substance on the morphology of the plant. As should be readily apparent, said regulation may also result from a combined or sequential effect of the chemical in the areas of both physiology and morphology.

In general, regulation of the natural growth or development which leads to a morphological change in the plant is readily noticeable by visual observation. Such changes can be found in the size, shape, color or texture of the treated plant or any of its parts. Similarly, changes in the quantity of plant fruit or flowers can be simply noted.

On the other hand, regulation which leads to changes in the physiological processes occur within the treated plant and are usually hidden from the eye of an observer. Changes of this type are most often in the production, location, storage or use of naturally occurring chemicals, including hormones, within the plant. Physiological changes in a plant may be recognized when followed by a subsequent change in morphology. Additionally, there are numerous analytical procedures known to those skilled in the art for determining the nature and magnitude of changes in the various physiological processes.

The individual compounds of the instant invention serve to regulate the natural growth or development of treated plants in a number of diverse ways, and it is to be understood that each compound may not produce identical regulatory effects on each plant species or at every rate of application. As stated above, responses will vary in accordance with the compound, the rate, the plant, etc.

A regulatory response demonstrated by the acetanilides useful in the practice of this invention can be generally termed retardation of vegetative growth and such a response has a wide variety of beneficial features. In certain plants this retardation of vegetative growth causes a diminution or elimination of apical dominance leading to a shorter main stem and increased lateral branching. This regulation of the natural growth or development of plants produces smaller, bushier plants which often demonstrate increased resistance to drought, lodging, temperature extremes, pest infestations and the like. Thus, the method of this invention provides for plants that are in a good state of health and tends to produce more vigorous plants.

In many types of plants, such as silage crops, potatoes, sugar cane, beets, grapes, melons and fruit trees, the retardation of vegetative growth caused by compounds of this invention results in an increase in the carbohydrate content of the plants at harvest. It is believed that by retarding or suppressing such growth at the appropriate stage of development, less of the available carbohydrate is consumed as plant food with a consequent enhancement of the starch and/or sucrose content.

Also with fruit trees, such as in apple orchards, retardation of vegetative growth is demonstrated by shorter branches which lead to more fullness in shape and may also result in lesser vertical elongation. These factors contribute to the ease of access to the orchard and simplify the fruit harvesting procedure.

As illustrated in the examples which are hereinafter presented, the individual acetanilides of the above formula, regulate the natural growth or development of treated plants in numerous other and different respects. Included among these other regulatory effects are the inducing of axillary bud development, the alteration of leaf shape, the delay or acceleration of fruit or pod set, etc. Although regulatory effects such as those described above can be desirable, often it is the ultimate result of these effects upon the economic factor which is of primary significance in crop plants or upon the aesthetic factor in ornamental plants. Thus, it must be recognized that increases in yield of individual plants, increases in the yield per unit of cropping area, improvement in the quality of the plants' product, improvement in the plants vigor and reductions in the cost of harvesting and/or subsequent processing are all to be considered in any assessment of the consequence of an individual regulatory effect during the growth or development of a plant.

Representative acetanilides of the foregoing formula useful in the practice of this invention include:
I. 2-chloro-2',6'-dimethyl-N-(acetoxymethyl) acetanilide
II. 2-bromo-2',6'-dimethyl-N-(acetoxymethyl) acetanilide
III. 2-chloro-2',6'-diethyl-N-(propionyloxymethyl) acetanilide
IV. 2-bromo-2'-methyl-6'-ethyl-N-(acetoxymethyl) acetanilide
V. 2-chloro-2',6'-diethyl-N-(cyclopropanecarbonyloxymethyl) acetanilide
VI. 2-bromo-2',6'-diethyl-N-(propionyloxymethyl) acetanilide
VII. 2-chloro-2',6'-dimethyl-N-(cyclopropanecarbonyloxymethyl) acetanilide.

In practicing the plant regulating methods of this invention the acetanilides generally are applied to plants in the form of a composition containing one or more materials referred to in this art as an adjuvant in liquid or solid form. Suitable plant regulating compositions are prepared by admixing the acetanilide with an adjuvant including diluents, extenders, carriers and conditioning agents to provide compositions in the form of finely divided particulate solids, granules, pellets, wettable powders, dusts, foams, solutions and aqueous dispersions or emulsions. Thus, the active acetanilide can be used with an adjuvant such as a finely divided particulate solid, a solvent liquid of organic origin, water, a foaming agent, a surface active agent, such as, wetting agents, dispersing agents, suspending agents and emulsifying agents or any suitable combination of such adjuvants. These compositions aid in the application of a uniform distribution of the active acetanilide to plants.

In selecting the appropriate non-herbicidal rate of application of the acetanilide (active ingredient) it will be recognized that precise dosages will be dependent upon the plant species being treated, the particular plant part or habitat to which application is made, the development stage of the plant, the particular acetanilide employed, the mode of application, such as soil incorporation, band application, broadcast application, foliar application and various other factors known to those skilled in the art. In foliar treatment for the regulation of plant growth, the active ingredients are applied in amounts from about 0.05 to about 10 or more pounds per acre. Foliar applications of from 0.1 to 5 pounds of the active ingredient per acre are preferred. In applications to the soil habitat of seedlings and established vegetation for the regulation of plant growth, the active ingredients are applied in amounts of from about 0.01 to about 20 pounds per acre or more. Preferably, the active ingredients are applied to the soil at a rate of from 0.1 to 10 pounds per acre. Foliar application to plants at the blooming stage, e.g. 10 percent blossoms, are particularly advantageous and are preferred.

The useful and unexpected plant growth regulating properties of the acetanilides of the foregoing formula are demonstrated by exemplary tests on dicotyledonous (soybean) and monocotyledonous (corn) plants set forth below. In these tests the acetanilide was applied as an aqueous composition. The aqueous compositions were prepared by solubilizing the required amount of the acetanilide in a volume of acetone which is further admixed with a like volume of 0.05 percent by weight aqueous solution of dioctyl sodium sulfosuccinate, surface-active agent, to provide sufficient composition which is applied at the rate equivalent to 200 gallons per acre to apply the acetanilide at the equivalent rate indicated.

EXAMPLE 1

A number of soybean plants are grown from seed in aluminum pans in a greenhouse for a period of approximately one week to the primary leaf stage. The plants are thinned to three uniform plants in each pan and the height of each plant is measured to the terminal bud and the average height is noted. One pan containing three soybean plants is used for each chemical treatment and four pans are not treated and used as a control. The aqueous composition of the chemical is then applied to the pan of growing plants by overhead spray at an established rate expressed as pounds per acre. The treated pans along with the control pans are watered from below, fertilized and otherwise maintained in a greenhouse under uniform growth conditions. Two weeks after application of the chemical the average height of the plants in the treated pan is determined as above and the difference in the average height before and two weeks after application represents the development of the treated plants. This development in growth of the treated plants is compared to the average development in growth of the plants in the control pans during the same period of time. A variation of 25 percent or more in the development of at least two-thirds of the treated plants when compared to the development of the control plants demonstrates that the chemical is effective for regulating the natural growth or development of the plants. Accordingly, a chemical is considered effective when the treated plants manifest at least a 25 percent decrease in height development when compared to the untreated control plants, i.e., retardation of vegetative growth.

Utilizing the procedure of Example 1, 2-chloro-2',6'-diethyl-N-(acetoxymethyl) acetanilide applied at a rate equivalent to about 6 pounds per acre demonstrated effective retardation of vegetative growth with slight burning of the leaves and at approximately 3 pounds per acre effective retardation of vegetative growth was demonstrated without any leaf burn. Similarly 2-chloro-2',6'-diethyl-N-(propionyloxymethyl) acetanilide applied at a rate equivalent to from about 6 pounds to 1.2 pounds per acre demonstrated effective retardation of vegetative growth with slight leaf burn. In like manner 2-chloro-2',6'-diethyl-N-(cyclopropanecarbonyloxymethyl) acetanilide demonstrated effective retardation of vegetative growth with slight leaf burn at rates equivalent to about 3 pounds to about 1 pound per acre.

EXAMPLE 2

A number of corn plants are grown from seeds in aluminum pans for a period of about one week after emergence. Then the corn plants are thinned to 3 uniform plants per pan and the average height of the plants to the top of the whorl is determined and noted. One pan containing 3 corn plants is used for each chemical treatment and four pans are not treated and used as a control. The aqueous composition of the chemical is then applied to the pan of growing plants by overhead spray at an established rate expressed in pounds per acre. The treated plants along with the control pans are watered from below, fertilized and otherwise maintained in a greenhouse under uniform growth conditions. Two weeks after application of the chemical the average height of the plants in the treated pan is determined as above and the difference in the average height before and two weeks after application represents the development of the treated plants. This development in growth of the treated plants is compared to the average development in growth of the plants in the control pans during the same period of time. A variation of 25 percent or more in the development of at least two-thirds of the treated plants when compared to the development of the control plants demonstrates that the chemical is effective for regulating the natural growth or development of the plants. Thus, a chemical is effective when the treated plants manifest at least a 25 percent decrease in height development when compared to the untreated control plants, i.e., retardation of vegetative growth.

Using the foregoing evaluation of Example 2, 2-chloro-2',6'-dimethyl-N-(acetoxymethyl) acetanilide effectively demonstrated retardation of vegetative growth when applied to the corn plants at a rate equivalent to about 3 pounds per acre.

Corn plants growing in sample plots in the field were treated with 2-chloro-2',6'-dimethyl-N-(acetoxymethyl) acetanilide at a rate equivalent to about one-half pound per acre using an overhead spray of the aqueous composition. The plants were about 5 weeks old at the time of treatment. While the treated plants when compared to control untreated plants growing under the same conditions demonstrated less than 15 percent difference in average total height (from the soil to the tip of the whorl) two weeks after application of the chemical, at maturity the treated plants demonstrated an average total height which was more than 15 percent less than that of the control plants. Thus, effective retardation of vegetative growth of corn plants treated at the 5 week old stage of development was demonstrated.

EXAMPLE 3

In this evaluation soybean plants growing in individual pots which were 4 weeks old (3-4 trifoliate stage) and 6 weeks old (5-6 trifoliate stage) were used for each application of chemical. An overhead spray of an aqueous composition of the chemical is applied to 2 pots at each growth stage at an equivalent rate as indicated below. Two to four sets of plants which receive no chemical application are included and serve as controls. All of the pots are maintained under good growing conditions and are watered and are uniformly fertilized under uniform conditions. Two weeks after the application of the chemical the growth response of the treated plants are compared with that of the control plants. The total height of the plant is measured to the tip of the terminal bud. A decrease of 15 percent or more in the average total height of the treated plants, when compared to that of the control plants, demonstrates that the chemical is effective for regulating the natural growth or development of the plants. In addition to this retardation of vegetative growth other observations indicating a response in the plants treated with chemicals of this invention were noted.

Using the procedure of Example 3, 2-chloro-2',6'-diethyl-N-(propionyloxymethyl) acetanilide at a rate equivalent to about 5 pounds per acre demonstrated more than 15 percent total height reduction in the soybean plants treated at both the 4 weeks and 6 weeks growth stage with minor leaf burn. At a rate equivalent to about 2.5 pounds per acre this acetanilide applied to 4 weeks old plants and 6 weeks old plants demonstrated two weeks after application retardation of vegetative growth greater than 15 percent in the 6 weeks old plants and did not reduce the height by at least 15 percent in the plants 4 weeks old at the time of treatment. In a similar manner 2-chloro-2',6'-diethyl-N-(cyclopropanecarbonyloxymethyl) acetanilide at a rate equivalent to about 2.5 pounds per acre demonstrated more than 15 percent total height reduction in the soybean plants treated at both the 4 weeks and 6 weeks growth stage with slight leaf burn. At application rates equivalent to about one and about one-half pound per acre the soybean plants treated at both the 4 weeks and 6 weeks growth stage demonstrated more than 15 percent total height reduction without leaf burn.

In general the soybean plants treated in accordance with Example 3 also demonstrated at various rates of application altered canopies, changes in leaf appearance and shape, darker foliar color and axillary bud development depending upon the chemical applied and the growth stage of the plant at the time of application.

From the illustrative examples above it should be clear that the regulatory response will be dependent upon the compound employed, the rate of application, the plant specie and its stage of development and other factors well understood by those skilled in the art.

In utilizing the methods of this invention it is advantageous to treat crops planted at excessive populations per unit area with an effective nonlethal amount of the acetanilide to elicit a growth response to the plant which compensates for the overcrowding in the field and the usual reduction in yield.

The methods of this invention can be conveniently carried out in conjunction with agronomic practices such as treating the plants with insecticides, fungicides, nematocides, fertilizer and the like. The application of compositions containing an acetanilide as herein defined and other agricultural chemicals such as selective herbicides, insecticides, fungicides, fertilizers, nematocides and the like are particularly advantageous for obtaining the desired results with minimum treatment costs.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A method of retarding the natural growth of desirable plants which comprises applying to said plants an effective, nonlethal, amount of a compound selected from those having the formula

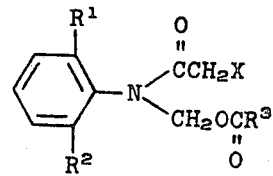

wherein:
$R^1$ and $R^2$ are independently methyl or ethyl;
$R^3$ is methyl, ethyl or cyclopropyl; and
X is bromo or chloro.

2. The method of claim 1 wherein X is chloro.

3. The method of claim 2 wherein both $R^1$ and $R^2$ are methyl or ethyl.

4. The method of claim 3 wherein the compound is 2-chloro-2',6'-dimethyl-N-(acetoxymethyl) acetanilide.

5. The method of claim 3 wherein the compound is 2-chloro-2',6'-diethyl-N-(propionyloxymethyl) acetanilide.

6. The method of claim 3 wherein the compound is 2-chloro-2',6'-diethyl-N-(cyclopropanecarbonyloxymethyl) acetanilide.

7. The method of claim 3 wherein the plants are corn plants.

8. The method of claim 3 wherein the plants are soybean plants.

* * * * *